United States Patent [19]
Schwerin et al.

[11] 3,990,473
[45] Nov. 9, 1976

[54] VALVE ARRANGEMENT
[75] Inventors: Günther Schwerin, Moglingen;
Erwin Kulmann, Markgroningen,
both of Germany
[73] Assignee: Robert Bosch G.m.b.H., Stuttgart,
Germany
[22] Filed: Dec. 27, 1974
[21] Appl. No.: 536,860

[30] Foreign Application Priority Data
Jan. 12, 1974 Germany............................ 2401399

[52] U.S. Cl................................ 137/609; 56/208;
92/165 PR; 137/595; 137/630.22
[51] Int. Cl.² .......................................... F16K 1/50
[58] Field of Search............ 137/596.2, 629, 630.14,
137/630.17, 637.1, 595, 533.17, 609,
543.21, 595, 385, 630.19, 630.22, 625.27;
92/165 PR, 129; 91/218, 321, 494; 251/77,
78, 213, 63.4, 77, 78; 308/3 R, 3 A

[56] References Cited
UNITED STATES PATENTS
1,552,768  9/1925  Smith.................................. 92/165
3,568,420  3/1971  Hofer et al.......................... 56/208

FOREIGN PATENTS OR APPLICATIONS
774,312  5/1957  United Kingdom................. 251/78

Primary Examiner—William R. Cline
Assistant Examiner—H. Jay Spiegel
Attorney, Agent, or Firm—Michael J. Striker

[57] ABSTRACT
A valve arrangement in which a follower is mounted on one end portion of a first valve member which extends into a space formed in a housing of the valve arrangement. The follower cooperates with a second valve member in a bore of the housing parallel to the bore in which the first valve member is reciprocatable. The bore in which the second valve member is arranged comprises a valve seat engageable by a portion of the second valve member, which is spring-biased in a direction in which the aforementioned portion thereof engages the valve seat, and the follower is arranged to move the portion of the second valve member away from its valve seat when the first valve member is moved in its bore in a predetermined direction.

8 Claims, 2 Drawing Figures

U.S. Patent  Nov. 9, 1976  3,990,473

VALVE ARRANGEMENT

BACKGROUND OF THE INVENTION

The present invention relates to a valve arrangement in which a cylindrical valve member is mounted in a bore of a housing of the valve arrangement projecting with an end portion thereof in a fluid-filled space closed at one end by a cover connected to the housing and in which a follower mounted on the aforementioned end portion cooperates with a second valve member guided in an additional bore in the housing parallel to the bore in which the first valve member is arranged, and in which the second valve member is spring-biased to normally engage the valve seat.

In a known valve arrangement of the aforementioned kind, the follower is constructed as an eccentric bolt mounted on the first valve member and arranged normal to the axis of the latter and in which the space in the housing is constituted by two cylindrical bores arranged normal to each other which are respectively closed at the outer ends thereof by two separate covers. To prevent turning of the first valve member about its axis, the eccentric bolt passes through an annular disc provided with a guide slot. This known construction is expensive to manufacture and liable to lead to difficulties during operation. In addition, the adjustability of the eccentric bolt is limited to twice the eccentricity of this bolt.

SUMMARY OF THE INVENTION

It is an object of the present invention to provide a valve arrangement of the aforementioned kind which avoids the disadvantages of the above described valve arrangement known in the art.

It is a further object of the present invention to provide a valve arrangement of the aforementioned kind which is composed of relatively few and simple parts so that the valve arrangement may be manufactured at very reasonable cost and will operate trouble free during extended use.

With these and other objects in view, which will become apparent as the description proceeds, the valve arrangement of the present invention mainly comprises a housing provided with a first bore, a second bore parallel to the first bore and a space at one of the ends of said bores adapted to be filled with fluid, a cover closing the space at the side thereof opposite from said ends of said bores, valve means including a first cylindrical valve member reciprocably arranged in the first bore for controlling flow of fluid through the valve means, said first valve member projecting with an end portion thereof into the aforementioned space, and follower means arranged on the end portion of the first valve member for cooperation with a second valve member in the second bore of the housing. The second valve member is spring-biased in a direction so that a portion on the second valve member engages a valve seat formed in the second bore. According to the present invention the aforementioned space and the follower means have a size and configuration so that the follower means can be slipped on the end portion of the first valve member in longitudinal direction of the latter and so that the follower means together with the surface defining the space provides means preventing turning of the first valve member about its axis.

In this way it is possible to construct the valve arrangement including the two valve members and the follower means mounted on one of the valve members and cooperating with the other in a very compact and simple manner. The fluid-filled space of the valve arrangement is closed at the outer end by a single cover of simple construction which can easily be assembled with the housing of the valve arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2:
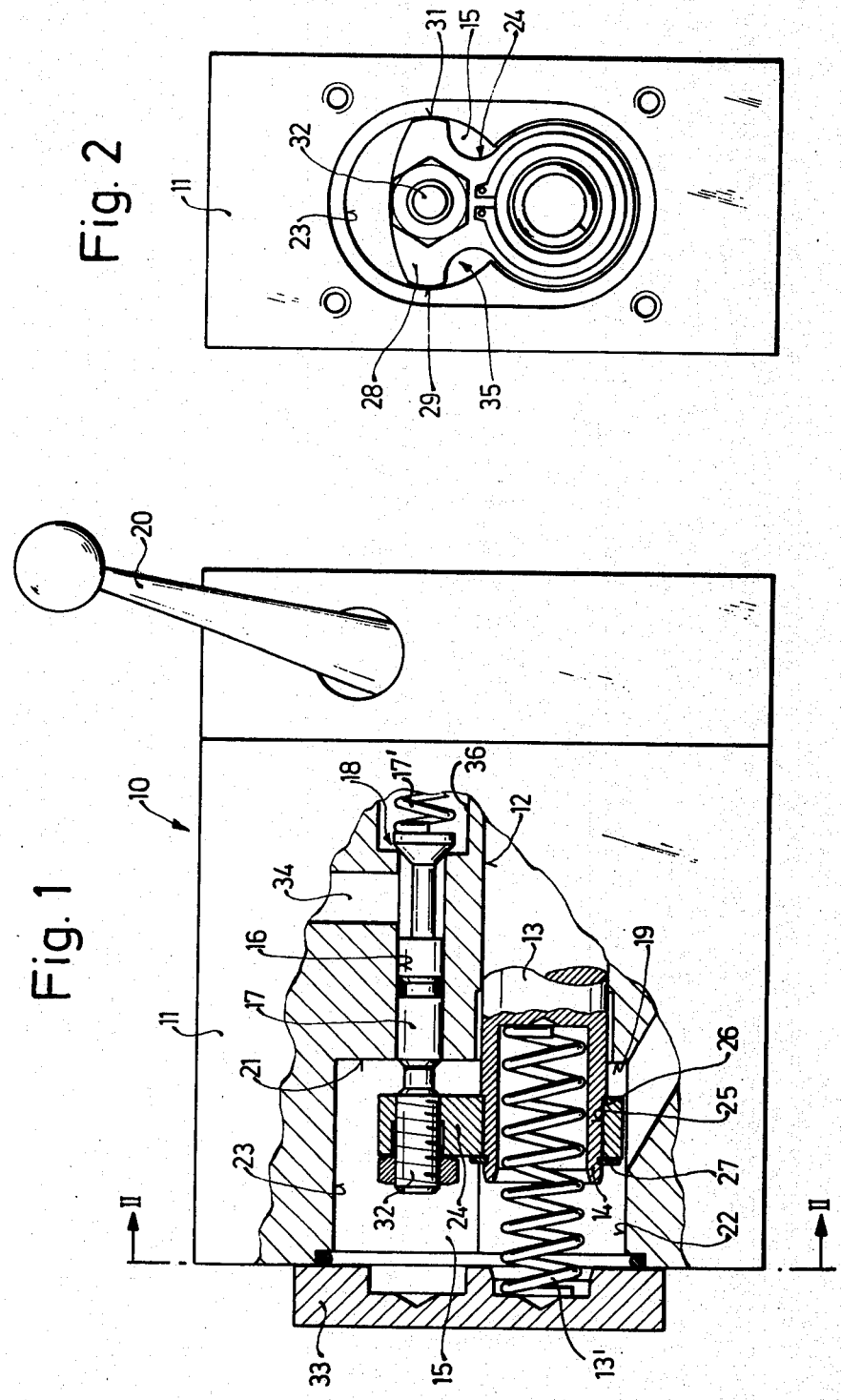
FIG. 1 is a partially sectioned side view of the valve arrangement according to the present invention.
FIG. 2 is a cross section taken along the line II-II of FIG. 1.

As shown in FIG. 1, the valve arrangement 10 according to the present invention comprises a housing 11 formed with a first bore 12 in which an elongated cylindrical member 13 of valve means of known construction is mounted for reciprocation. The valve means of which the cylindrical substantially sleeve-shaped member 13 forms part is well known in the art and for instance disclosed in the German Gebrauchsmusterschrift 1,901,881 or in the U.S. Pat. No. 3,568,420 to which reference may be had for a detailed showing of the valve means, the specific construction of which does not form part of the present invention. A lever 20 cooperates with linkage means, not shown in the drawing, in a known manner as likewise fully disclosed in the above mentioned German Gebrauchsmusterschrift and the U.S. patent with the valve member 13 to move the latter towards the left, as viewed in FIG. 1, against the bias of a compression spring 13' engaging the valve member 13 and biasing the latter towards the right. The valve member 13 projects with an end portion 14 thereof into a space 15 filled with pressure fluid. The housing 11 is further formed with a second bore 16, parallel to the bore 12, in which a second valve member 17 is arranged for reciprocation. The second valve member 17 has a preferably conical portion 18 adapted to engage a valve seat formed in the second bore and the valve member 17 is biased by a spring 17' so that the conical portion 18 of the valve member 17 is normally held against the valve seat. The parallel bores 12 and 16 open on their left ends, as viewed in FIG. 1, into two blind bores 22 and 23 which form together the aforementioned space 15. The blind bores 22 and 23 extend parallel to each other and intersect partially, as best shown in FIG. 2, so that the surface defining the space 15 has in a cross section normal to the axes of the bores substantially the form of a number 8.

Follower means 24, 32 are mounted with a light press fit on the end portion 14 of the valve member 13 and the guide member 24 of the follower means is for this purpose formed with a bore 25 having a diameter substantially equal to the outer diameter of the end portion 14 of the valve member 13. The end portion 14 of the valve member has a slightly smaller diameter than the remainder thereof so as to form at the junction of the end portion 14 with the remainder of the valve member 13 a shoulder 26 against which the right face of the member 24 abuts, whereas a snap ring 27 located in a groove formed in the end portion 14 engages the left face of the member 24 so that the latter is fixed on the valve member 13 against axial displacement. The guide member 24 has a guide portion 28 located in the blind bore 23 and provided at opposite ends with curved guide faces 29, 31 engaging the inner surface of the bore 23. The follower means include further a screw 32 adjustably mounted in a correspondingly threaded bore of the guide portion 28 extending substantially coaxial with the axis of the second valve member 17, and just abutting with its right end, as viewed in FIG. 1, in the shown neutral position of the valve arrangement 10 against the left end of the second valve member 17.

The guide faces 29 and 31 will slide during movement of the valve member 13 in longitudinal direction along the inner surface of the blind bore 23 and prevent in this way a turning of the valve member 13 about its axis, which is necessary since the lever 20 and the above mentioned linkage means connected thereto and engaging the valve member 13 do not prevent such a turning. The space 15 is closed at its outer end by a cover 33 connected to the housing 11 of the valve arrangement in any known manner. The guide faces 29 and 31 form therefore part of means 35 preventing turning of the valve member 13 about its axis.

The valve arrangement of the present invention is a very compact construction since closing of the fluid filled space 15 can be accomplished with a single cover 33. The follower means 24 can be easily assembled on the end portion 14 of the valve member 13 by being pushed thereon in axial direction of the valve member, after removal of the cover, and then fixed in axial direction by mounting the snap ring 27 in the groove of the end portion 14. The follower means 24 also prevent, as mentioned before, an undesirable turning of the valve member 13 about its axis. The axially adjustable screw 32 is easily accessible by removing the cover 33 and can be adjusted over a relatively large range in an exact manner.

The operation of the valve arrangement 10 is well know and, for instance, described in the aforementioned German Gebrauchsmusterschrift 1,901,881 as well as in the likewise above mentioned U.S. Pat. No. 3,568,420. It is only mentioned that in the neutral position of the two valve members, as shown in FIG. 1, pressure fluid from a source of pressure fluid, for instance a pump, not shown in the drawing, is prevented to flow through the channel 34 which is connected to a consumer, likewise not shown in the drawing, whereas upon turning of the lever 20 in counterclockwise direction, the valve member 13 will be moved against the bias of the spring 13' in the manner as shown in the aforementioned Gebrauchsmusterschrift and the mentioned U.S. patent towards the left, as viewed in FIG. 1, so that the pressure fluid from the non-illustrated pump will flow in a manner as likewise disclosed in the aforementioned Gebrauchsmusterschrift and the U.S. patent into the channel 34 and from there to the non-illustrated consumer, whereas when the lever 20 is turn in clockwise direction, the valve member 13 will be moved under the action of the compression spring 13' towards the right, as viewed in FIG. 1, thereby moving the valve member 17 likewise toward the right against the action of the spring 70' so that the pressure fluid from the passage 34 may flow into the passage 36 which is connected to a tank, not shown in the drawing.

The valve arrangement according to the present invention is distinguished by its compact construction as well as by the ease of assembly and adjustability of the follower means which cooperate with the second valve member. Furthermore, the various movable members of the disclosed valve arrangement may be mounted in a cylindrical housing instead of in the prism-shaped housing 11, as shown, which may be advantageous in certain applications of the valve arrangement. The valve arrangement according to the present invention is therefore universally usable and of further importance since it prevents the valve member 13 from undesirably turning about its axis so that the lever 20 and the non-illustrated linkage connected thereto may be constructed in a simple manner to simply engage the valve member 13 for moving the same towards the left, as viewed in FIG. 1 without having the function of preventing the valve member 13 from turning about its axis.

It will be understood that each of the elements described above, or two or more together, may also find a useful application in other types of valve arrangement differing from the types described above.

While the invention has been illustrated and described as embodied in a valve arrangement having two valve members mounted in parallel bores of a housing and a follower mounted on one of the valve members for moving the other valve member in axial direction while preventing the one valve member from turning about its axis, it is not intended to be limited to the details shown, since various modifications and structural changes may be made without departing in any way from the spirit of the present invention.

For instance, the shoulder 26 and the snap ring 27 may be omitted on the end portion 14 of the valve member 13 and the follower 24 may be mounted on the end portion 14 of the valve member 13 with a tight press fit.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A valve arrangement comprising a housing provided with a first bore, a second bore parallel to said first bore and a space at one of the ends of said bores adapted to be filled with fluid; a cover closing said space at a side thereof opposite from said one ends of said bores; a first cylindrical valve member reciprocably arranged in said first bore, said first valve member projecting with an end portion thereof into said space; a valve seat formed in said second bore; a second valve member in said second bore having a portion adapted to engage said valve seat; biasing means for biasing said second valve member in a direction so that said portion engages said valve seat; follower means on said end portion of said first valve member arranged to move said second valve member against the force of the biasing means to disengage said portion of said second valve member from said seat when said first valve member is moved in a direction away from said cover, said space and said follower means having a size and configuration so that said follower means can be pushed onto said end portion of said first valve member in longitudinal direction of the latter, said follower means being fastened in tight engagement with said first valve member, said follower means together with wall portions defining said space constituting means for preventing turning of said first valve member about its axis; and means cooperating with said first valve member for reciprocating the same in said first bore.

2. A valve arrangement as defined in claim 1, wherein said space is constituted by two parallel blind bores intersecting each other and having end faces opposite said cover at which said first and said second bore open.

3. A valve arrangement as defined in claim 2, wherein said follower means comprises a guide member having a portion provided with a bore through which said end portion of said first valve member projects and having a diameter corresponding to the outer diameter of said end portion of said first valve member so that said guide member is mounted with a press fit on said end portion.

4. A valve arrangement as defined in claim 3, wherein said guide member has spaced from said bore in said portion thereof a guide portion having two guide faces which are guided on the inner surface of said one blind bore at which said second bore in said housing opens.

5. A valve arrangement as defined in claim 4, wherein said guide faces are curved substantially according to the curvature of the cylindrical surface defining said one blind bore.

6. A valve arrangement as defined in claim 3, wherein said end portion of said first valve member is provided with a shoulder and a groove axially spaced from said shoulder, said portion of said guide member abutting with one face thereof against said shoulder, and a snap ring in said groove engaging the opposite face of said portion of said member.

7. A valve arrangement as defined in claim 4, wherein said follower means further comprises an elongated member connected to said guide member in the region of said one blind bore and cooperating with said second valve member.

8. A valve arrangement as defined in claim 7, wherein said elongated member of said follower means is constituted by a screw adjustably threaded in a threaded bore of said guide member and substantially coaxially arranged with said second valve member.

* * * * *